United States Patent [19]

Loeffler

[11] 4,195,736
[45] Apr. 1, 1980

[54] EGG GRADING SYSTEM

[75] Inventor: Thomas V. Loeffler, Fenton, Mich.

[73] Assignee: Diamond International Corporation, New York, N.Y.

[21] Appl. No.: 870,464

[22] Filed: Jan. 18, 1978

[51] Int. Cl.² .................. B07C 5/16; A01K 43/08
[52] U.S. Cl. .................... 209/516; 209/919; 209/925; 177/188; 198/442; 198/480; 198/792
[58] Field of Search ............. 209/513, 512, 516, 914, 209/919, 922, 925; 198/436, 442, 480, 481, 792, 858; 177/188

[56] References Cited
U.S. PATENT DOCUMENTS

| 2,883,177 | 4/1959 | Dannehl et al. | 177/188 X |
| 3,354,974 | 11/1967 | Kintner et al. | 177/188 X |
| 3,426,894 | 2/1969 | Page | 209/516 |
| 3,952,865 | 4/1976 | Rudszinat et al. | 198/792 X |

Primary Examiner—Joseph J. Rolla
Attorney, Agent, or Firm—Kenyon & Kenyon

[57] ABSTRACT

An improved high speed egg grading system wherein a pair of opposed lifting bars disposed on rotating rings transfer eggs over a plurality of weighing stations, and a conveyor belt is provided for removing graded eggs spaced two abreast. An improved drive is provided for the bars which insures gentle pick-up and set down of the eggs at weighing stations where scales incorporating damping means to reduce settling out time are located.

17 Claims, 7 Drawing Figures

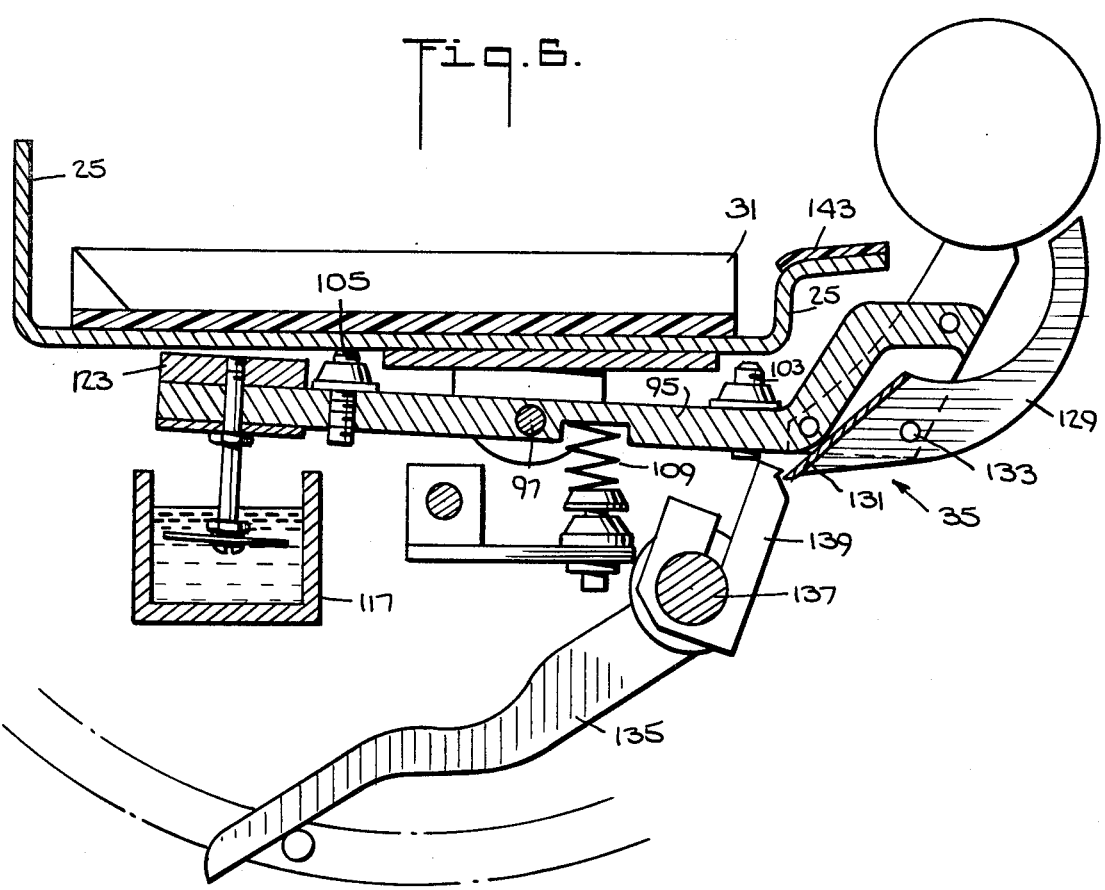
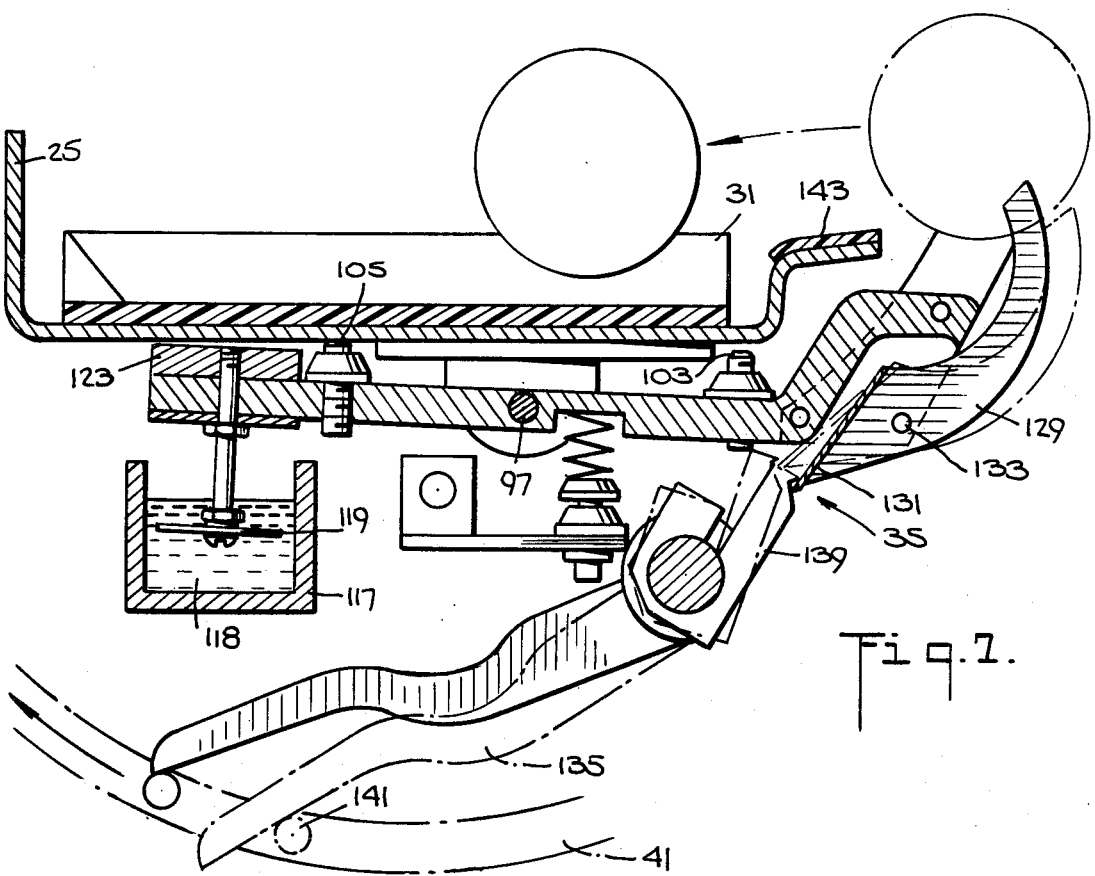

EGG GRADING SYSTEM

BACKGROUND OF THE INVENTION

This invention relates to a system for grading articles and separating them into a plurality of classes, the members of each class being within predetermined maximum and minimum limits of weight and size in general, and more particularly, to an improved egg grading system.

The processing of eggs at large chicken farms or at processing plants has been automated to a large degree. Eggs received from the farm are automatically or semi-automatically, washed, oiled, checked for blood spots, candled, graded, counted and packed. One of the important elements in the process is the egg grader. Egg graders must separate the eggs into the grades established by appropriate government agencies. Specific minimum weights are set for eggs that are termed 'small', 'medium', 'large' and 'extra-large'. Eggs which are larger than 'extra-large' are termed 'jumbos' and eggs smaller than 'small' are termed 'pee-wees'. The purpose of the egg grader is to automatically separate and grade eggs as they come from the farm. The grader is important in that it must insure that the eggs comply with the weight requirements established by the government. Furthermore, the egg grader must be integrated with other processing operations and perform in a comparable manner. Thus, it is desired that such a grader have a speed which is comparable with the other processing equipment, e.g., washers, packers, etc.

One prior art egg grader is of a type disclosed in U.S. Pat. No. 2,731,146 which includes a plurality of weighing stations. One such weighing station for 'jumbo' eggs separates all eggs which exceed the weight limits for 'extra-large' eggs. Sequentially, thereafter, weighing stations for 'extra-large', 'large', 'medium' and 'small' are provided. At each station, the eggs meeting the requirement for that weight must be separated out and the remaining eggs moved on to the next weighing station. Weighing is simultaneously made of a plurality of eggs, for example, six in parallel. The six eggs are brought in by a conveyor to a first set of six scales. The scales are such as to activate a trip mechanism if the weight of the egg exceeds the weight preset on the scale. A mechanism is provided to remove the egg from the scales which have been activated, onto a conveyor belt running perpendicular to the direction of the egg's movement from station to station. Eggs which do not exceed the preset weight are then picked up by a rotating lifter and transferred to the next scale. This process continues until the last eggs, the 'pee-wees', are deposited at the end of the apparatus.

As alluded to above, the prior art graders lack sufficient speed to perform properly in association with more current equipment. This lack of sufficient speed can be traced to a number of requirements placed on the grader system. As noted above, the eggs which exceed the weight of a scale are deposited onto a conveyor belt. Since there is a row of six eggs across the apparatus, it has been necessary in prior art devices for an egg from a previous cycle to be conveyed essentially out of the grading machine prior to another transfer from the scales to the conveyor. Otherwise, a collision between eggs would occur resulting in breakage. Since there are limits on conveyor belt speed, it was necessary to either limit the number of eggs processed in parallel, or to limit the overall processing speed of the machine so that it was insured that the last egg had cleared the processor before another transfer of eggs took place. Another drawback relates to the lifters which must gently lift the eggs off the scale. This placed a limit on the speed at which the machine could be operated, at least when contacting the egg and also when setting it down on the next scale, further slowing the machine. Moreover, it is heretofore common practice to use a single lifter bar on a rotatable member at each processing station. Thus, processing is also limited by the maximum speed at which this bar may be rotated through 360°. Finally, in the prior art there is some difficulty with the scales themselves. The scales, once an egg is placed thereon, have a tendency to oscillate so that a waiting time is necessary in order for the oscillation to dampen out.

The present invention overcomes these prior art drawbacks with an improved egg grading system which is capable of a significantly increased speed of operation.

SUMMARY OF THE INVENTION

Briefly stated, the improved egg grader of this invention is provided with a conveyor belt for removing the eggs which have been graded and which has a width adapted to accommodate two rows of eggs. Guide means are provided to guide the eggs coming from the far end of the conveyor belt to the outside half of the belt thereby freeing the inside half of the belt for an additional deposit cycle. In this manner, for the same number of parallel eggs being processed, the conveyor belt moves only half the distance as was the case in the prior art before it is free to receive additional eggs. To further speed up the processing, each station has associated therewith two lifting bars which are disposed diametrically opposed on rotating rings. Thus, with one rotation of the ring, two transfer cycles take place. Phasing between the various weighing stations is achieved so as to prevent interference between adjacent lifters; i.e., adjacent weighing stations have their bars 90° out of phase with each other. Also an improved scale is provided which includes damping means to allow rapid transfer of the egg to the conveyor belt and which is no longer a constraint to the attainable speed of the machine. Finally, in order to permit a higher speed of rotation of the rings and thus a greater overall tangential speed of lifters on the end thereof, a special eccentric drive is used. This drive insures that, at the point of pick-up and the point of placement on the scales, the drive is moving slowly, while over the remainder of the path of travel, it is moving at a relatively fast speed.

Thus, an improved egg grading system capable of a higher speed of operation is disclosed herein.

BRIEF DESCRIPTION OF THE DRAWINGS

FIGS. 6 and 7 are cross-sectional views of the egg weighing scale showing the manner in which the scale is tripped to deposit an egg onto the conveyor belt.

DETAILED DESCRIPTION OF THE PREFERRED EMBODIMENT

The overall general layout of an egg grading apparatus is described in U.S. Pat. Nos. 2,731,146 and 3,426,894. Thus, certain aspects of the machine such as the conveying means which transfer the eggs to the grader of the present invention are not shown or discussed in detail herein. Only those mechanisms which relate to the present invention are described in detail herein.

Figure 1:
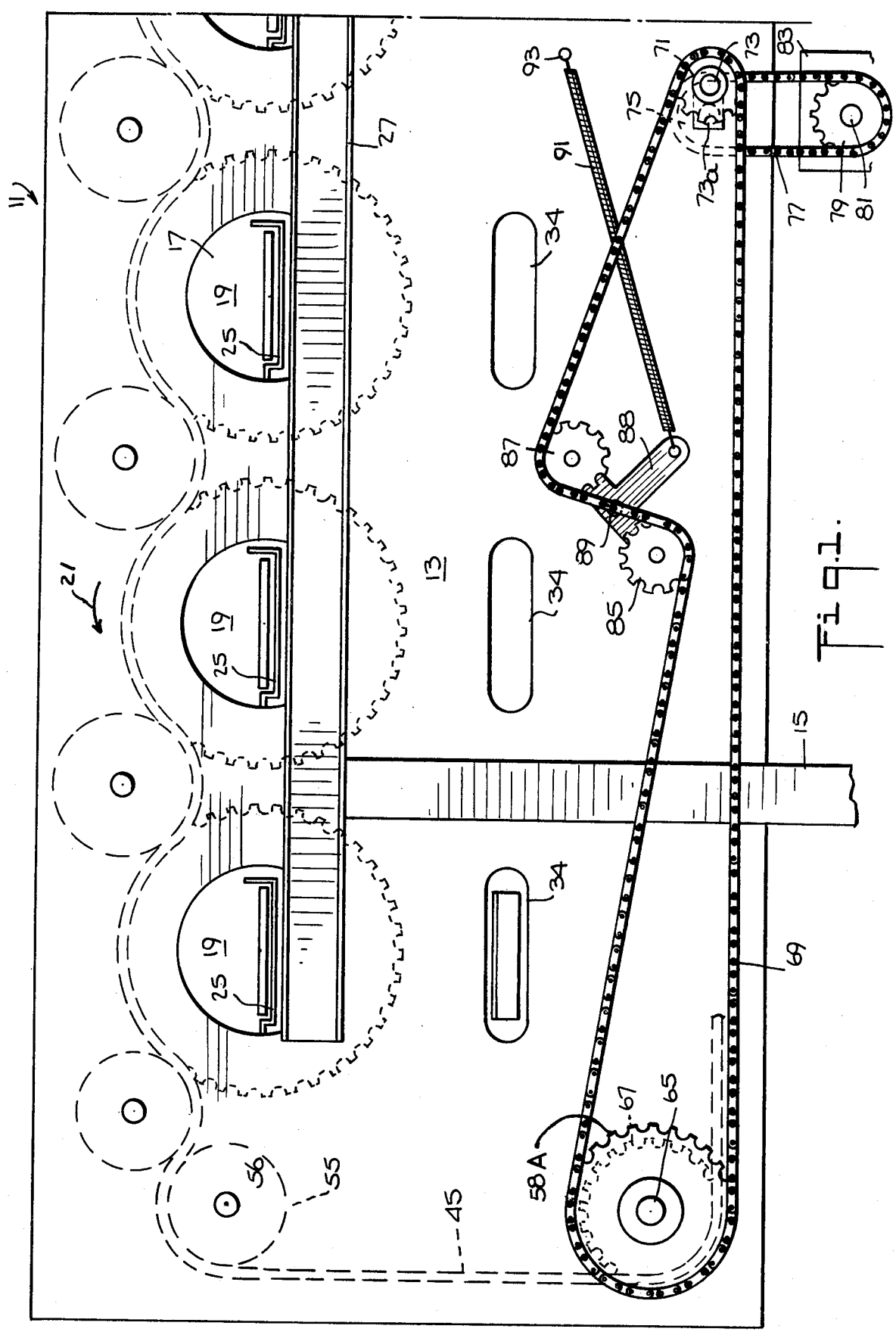
FIG. 1 is a side view of the apparatus of the present invention showing the main drive mechanism.

Referring to FIG. 1, a portion of the drive system of the apparatus of the present invention is shown. The egg grading mechanism is contained within a generally rectangular frame structure 11, one side 13 of which is partially illustrated on FIG. 1. The frame structure 11 is supported on four legs 15. A plurality of openings 17 are formed in the sides to accommodate conveyor belts for removing the graded eggs. Each opening is associated with a weighing station 19. Eggs move from the right of FIG. 1 to the left being successively weighed at each of the weighing stations 19. This general direction of movement is indicated by arrow 21. At right angles to the direction of movement of the eggs are disposed support members 25 which are adapted to support the conveyor belts. The support members 25 extend through the openings 17 spaced above brace 27 and are supported by means of brackets attached to the rectangular frame structure.

Figure 2:
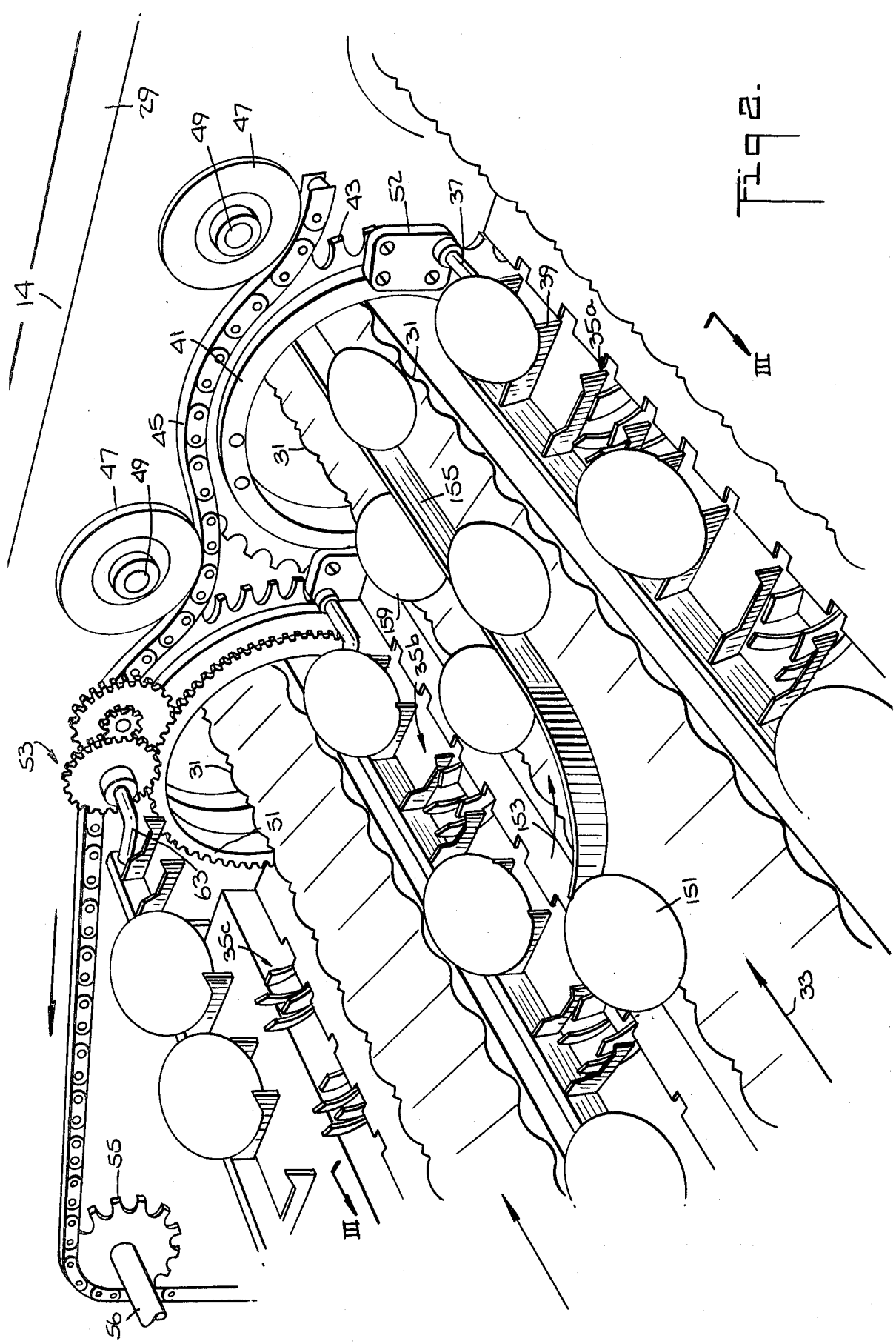
FIG. 2 is a perspective view showing the egg lifting bars and gearing associated therewith.

Referring to FIG. 2, the other side 14 of the structure 11 is visible and, as illustrated, is formed with an inwardly directed flange 29 at its top. Shown in FIG. 2 are the conveyor belts 31 which rest on the support members 25 and are driven in conventional fashion in the direction of arrows 33. Belts 31 loop beneath the upper conveying path and pass through the openings 34 (FIG. 1) on their return path. Eggs enter the apparatus from the right hand side of FIG. 2 and move to the left. The eggs are lifted from an incoming conveyor system, not shown in the figure, onto a first row of scales 35a. Although in the embodiment illustrated, each weighing station 19 is provided with a plurality of weighing scales 35, it is noted that other arrangements such as placing the scales only at the first station is possible. In such a system, the weight data generated at the first station for those eggs not within the specifications for that station is transmitted to the subsequent stations at which the egg would be removed.

In a manner to be explained below, if an egg meets weight requirements for a given weighing station, the scale on which it rests is caused to trip and means push the egg onto its associated conveyor belt 31. The eggs that remain are the ones which were not heavy enough to meet the requirements for that station. These eggs are picked up by a bar 37 having a plurality of cradles 39 thereon, one disposed so as to engage an egg at each scale. The bars are mounted at the periphery of rings 41 visible on both FIGS. 1 and 2, a ring being disposed on each side 13 and 14 of the frame 11. The rings 41 are rotatably mounted and supported in the sides 13 and 14 of frame 11. Means to be described below maintain the cradles 39 fixed with respect to the vertical as the rings 41 rotate. Two bars 37, diametrically opposed and each having cradles 39, are disposed on each ring 41. Thus, while the bar 37 is picking eggs up from the scales 35a, at the first weighing station, another bar 37 is depositing previously picked up eggs on scales 35b at the second station. The rings 41 on frame sides 13 and 14 contain sprockets 43 which engage chains 45. Proper contact of the chains 45 with the sprockets 43 is maintained by rollers 47 journaled about shafts 49 which are rotatably mounted in frame sides 13 and 14. On the inside of ring 41 is disposed a gear 51 which engages gear train 53, to be more fully described in connection with FIG. 3 and which maintains the bars 37 in the same orientation with respect to the horizontal so that the cradles 39 at all times hold the eggs properly. The gear 51 and the gear train 53 for bars 37 of the other grading station in FIG. 2 is disposed on the ring 41 on frame side 13 not visible in the figure.

With further reference to FIG. 2, plate 52 containing a suitable bearing is attached to ring 41 and supports the end of bar 37. The bars 37 associated with the ring 41 on the left hand side of FIG. 2 are disposed so as to be 90° out of phase with the bars 37 of the adjacent ring. Thus, the eggs on the bar 37 at the left are approximately at their maximum vertical height and after an additional 90° of rotation, will be placed on a scale 35c. At the same time, a bar 37, diametrically opposite the illustrated bar 37, will pick up eggs from scales 35b.

The chain 45 passes over an idler sprocket 55 on a shaft 56 and is coupled to a drive mechanism to be more fully described below. As illustrated, it engages the sprockets 43 on a ring 41 at each of the weighing stations 19 in the apparatus of the present invention.

Figure 3:
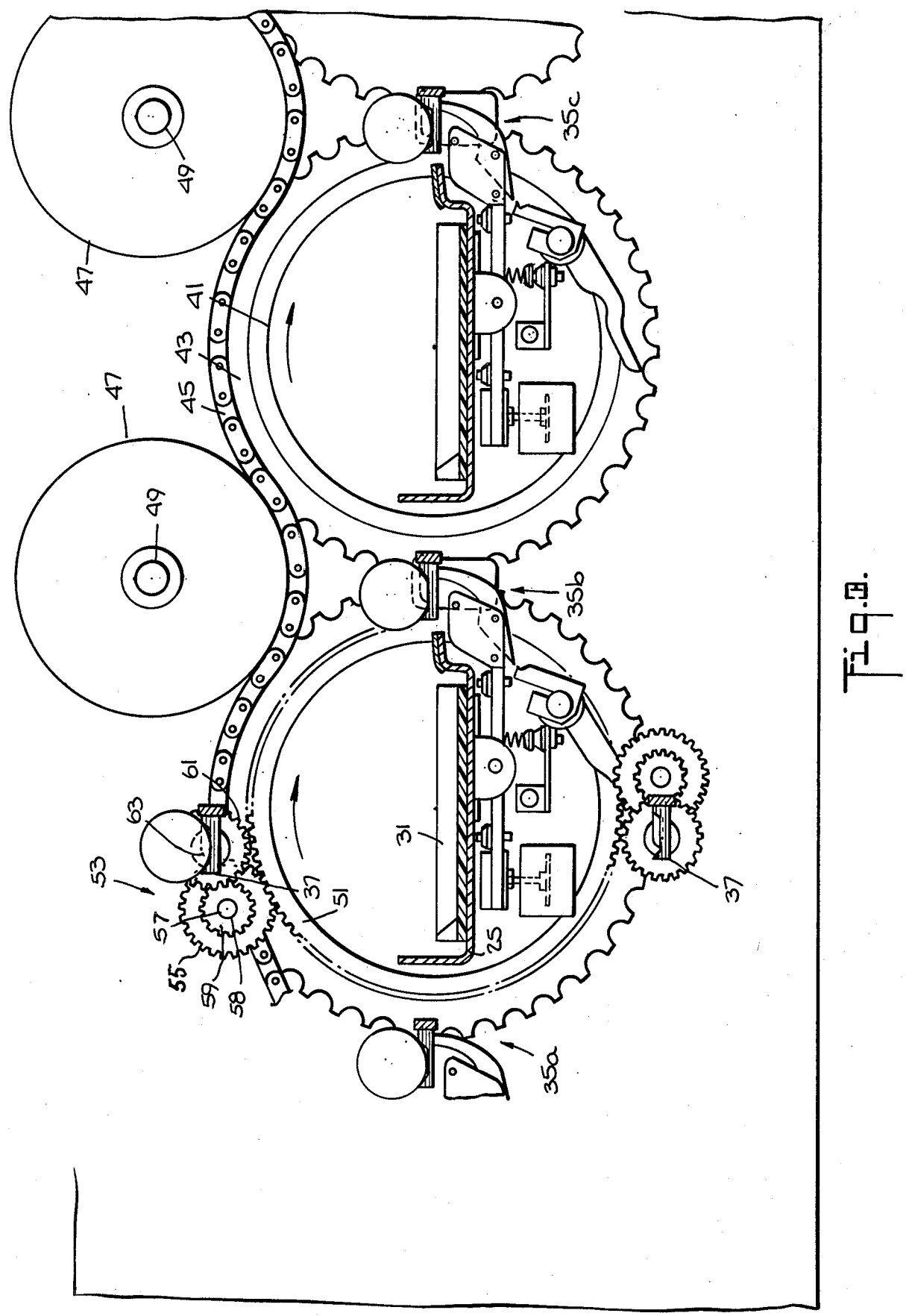
FIG. 3 is an additional side view, partially in cross-section, showing the gearing and drive system in greater detail and also illustrating the location of the weighing scales and conveyor belt.
Figure 4:
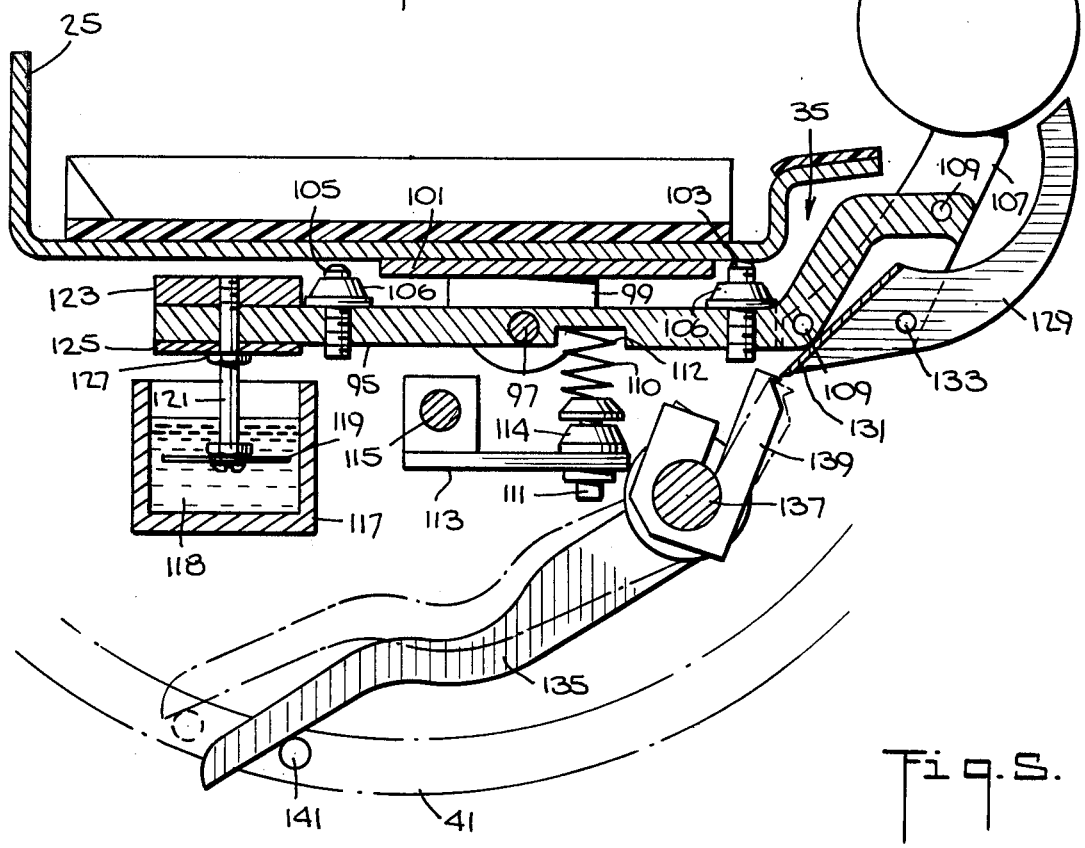
FIG. 4 is a cross-sectional view through an egg weighing scale showing the improved damping means of the present invention.
Figure 5:
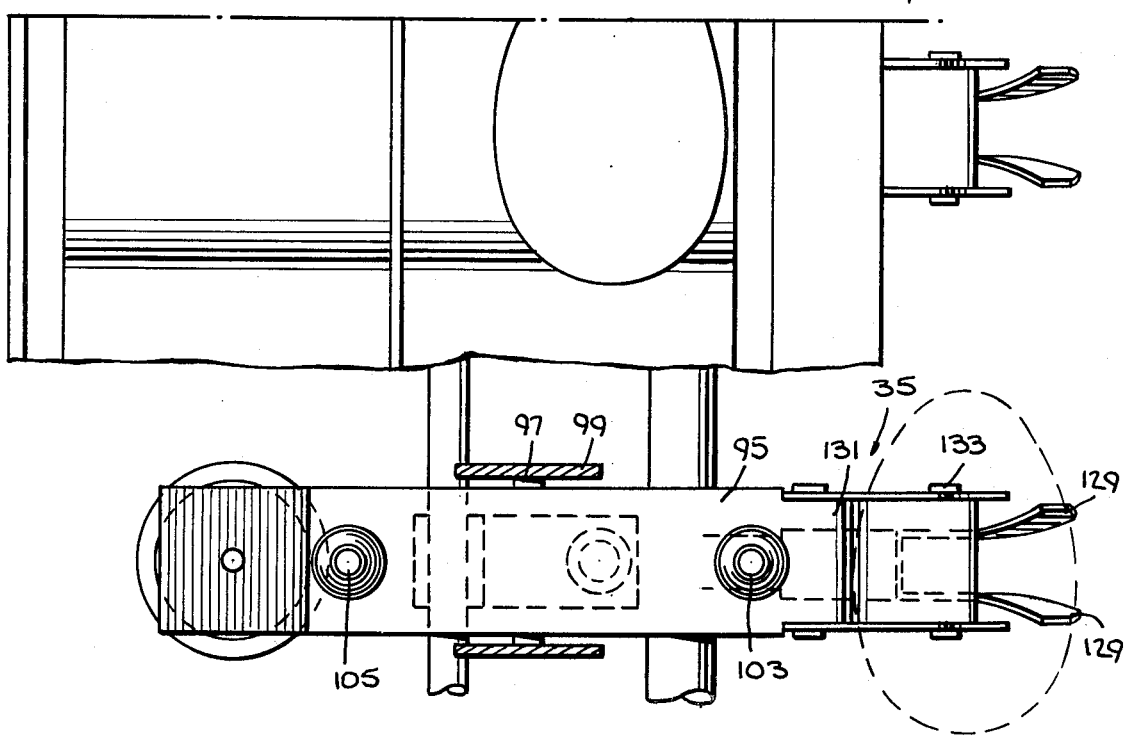
FIG. 5 is a plan view, partially cut away, of the egg weighing scale of FIG. 4.

FIG. 3 is a cross-sectional view along the line III-III of the apparatus shown in FIG. 2. Shown are the belts 31 and their supports 25, along with the rings 41 with the sprockets 43 thereon, chain 45, the chain rollers 47, the bars 37, scales 35a, 35b and 35c, and the gear train 53. As illustrated, the scales 35a, b and c are mounted to the bottom of the supports 25. The mechanism of these scales will be described in detail in connection with FIGS. 4-7. Referring now to the gear train 53 of FIG. 3, gear 51 on the ring 41 engages a gear 55. Gear 55 is mounted on a common shaft 58 and rigidly connected to a gear 59 to form a double idler. Gear 59 in turn engages a gear 61. The gear 61 is attached to a shaft 63, also shown on FIG. 2, which is bent 90° and coupled to the rod 37. This gearing arrangement ensures that the cradles 39 remain fixed with respect to the horizontal as they move through 360° with the ring 41. The shaft 58 associated with the gears 55 and 59, and the shaft 63, are rotatable in a support structure which is connected to and moves with the ring 41.

The chains 45, which drive the sprockets 43, are driven by sprockets 67 as shown in FIG. 1. The sprockets 58A and 67 are mounted on shaft 65 which is supported for rotation in suitable bearings mounted in frame sides 13 and 14. The shaft 65 extends through the side 13 and has attached to it, on the outside thereof, sprocket 58A. This sprocket engages a chain 69 driven by a sprocket 71 fixedly supported on an eccentric crankshaft 73, the other end of which, indicated as 73a, passes through the sides 13 and 14 supported on suitable bearings therein. On the inside of side 13 is a sprocket 75 which engages a chain 77 also engaging a sprocket 79 on the end of the shaft 81 of a motor 83. Operation of the motor 83 results in rotation of the sprocket 79 and thus the rotation of the sprocket 75. This rotary motion is converted into an eccentric motion at the end of the shaft 73 at which is located the sprocket 71. Since the length of chain between the sprocket 71 and the sprocket 58A will change as the sprocket rotates because of the eccentric motion, a set of spring loaded idler sprockets 85 and 87 on opposite sides of a T-shaped bar 88 which is pivotable on the side 13 about pin 89, is provided to keep chain 69 tight. The stem of the T-shaped bar 88 has its end coupled by means of spring 91 to the side 13, attachment being at a point 93. The gear ratios between the various sprockets are such that at each point where one of the cradles is picking up or setting down an egg, the eccentric drive, specifically sprocket 71, is at the position shown in FIG. 1. At this position, there is a very slow movement of the sprocket 67. For the remaining path of travel, movement is considerably faster. Thus, at the point of picking up and depositing the eggs, a very gentle motion takes place, but, in between, the motion is fast so as to permit maintaining a high speed while at the same time handling the eggs gently.

A typical scale 35 is illustrated on FIGS. 4–7. As shown in the cross-sectional view of FIG. 4 and plan view of FIG. 5, scale 35 includes an elongated scale beam 95 supported for rotation on a shaft 97 and having a generally rectangular cross-section. Beam 95 is supported for rotation in brackets 99 containing suitable holes for the shaft 97. The brackets depend downwardly from a support 101 by means of which the scale is attached to support member 25. On the right hand portion of the beam 95 is an adjustable stop 103. A second adjustable stop 105 is disposed on the other side of the pivot. Both stops comprise set screws rotatable in nuts 106 attached to beam 95. Attached to the end of the beam 95 on the right hand side, the beam at this point extending upwardly and outwardly, are a pair of fingers 107 upon which the egg rests. Attachment may be by means of rivets 109 or the like. The beam 95 is biased upward on the right hand side by means of a counterweight 123 and an adjustment spring 110, the compression of which can be set with a set screw 111. Spring 110 fits in a recess 112 in beam 95. The set screw 111 turns in a nut 114 mounted to a support 113 which in turn is rigidly mounted to a shaft 115 which extends between the two sides 13 and 14 of the apparatus of the present invention. At each of the stations 19 of FIG. 1, the counterweight is selected corresponding to the egg grade to be selected with the spring 110 serving to provide any necessary adjustments.

In accordance with the present invention, on the left hand end of the beam 95 is disposed a dash pot 117 containing a damping fluid 118 such as oil. A damping disc 119, on the end of a bolt 121, which is secured to the beam 95 using threaded counterweight 123 on the top of the beam and washer 125 and nut 127 on the bottom of the beam, is disposed within the oil 118. As a result, when an egg is placed on the fingers 107 and acts to push down on the beam, the dash pot 117 with the oil 118 therein, cooperating with disc 119, dampens oscillations that would otherwise occur resulting in a final accurate weight being obtained in a shorter time.

Pivotally mounted to the fingers 107 are a pair of kicker arms 129. The two arms are spaced by means of a connecting section 131 which is integral therewith. Suitable holes are formed, both in the kicker arms 129 and the fingers 107, to permit passing through a riveted shaft 133 or the like, allowing rotation of the kicker arms 129 thereabout. Because of the weight of the kicker arms, in the normal condition, the connecting portion 131 will rest against the beam 95 as shown. Disposed below the scale is an arm 135 rigidly coupled to a shaft 137 which is supported in suitable bearings in the sides 13 and 14 of the apparatus. Only one such arm is provided at each weighing station. Also rigidly mounted to the shaft 137 are a plurality of trip arms 139, one for each scale 35. The arm 135 is adapted to engage the protruding bushing 141 on the periphery of the ring 41, the bushing moving the arm 135 between the two positions shown on the figure and thereby rotating the tripper arms 139. For the example shown in FIG. 4, the egg has insufficient weight to overcome the force of the counterweight 123 and spring 110 and the beam 95 is in a position where the stop 103 is in engagement with support member 25. In this position, as the tripper arm 139 rotates, it does not engage the edge of the member 131 and the egg is not pushed off the scale. Rather, the egg remains on the scale and is picked up by one of the arms 37 and moved to the next weighing station. In other words, the egg is not heavy enough for this station.

FIGS. 6 and 7 illustrate the scale mechanism when the egg weight is equal to or above the present amount. Now, the egg has overcome the force of the counterweight 123 and spring 110 and the beam 95 has rotated so that the right hand end is depressed with the stop 103 away from the support 25. As the tripper arm 139 comes around, it engages the edge of the connecting member 131 rotating the kicker arms 129 on the shaft 133 to push the egg off the scale and onto the conveyor belt 31. At the edge of the support 25 where the egg rolls onto the conveyor belt, a suitable protective material 143 is provided to prevent damage to the egg. FIG. 7 illustrates the motion which takes place as the bushing 141 engages the end of the arm 135 to rotate it and the tripper arm 139 to carry out the motion of the kicker arms 129 which push the egg off the scale and onto the conveyor belt 31. Again, the effect of the disc 119 within the damping fluid 118 in the dash pot 117 is noted.

Referring again to FIG. 2, the movement of an egg 151, which has been kicked off a scale, in the direction of arrow 153 is shown. A guide 155 is provided to guide this egg to the outside of conveyor belt 31. Thus, egg 159 which was ejected on the prior cycle cannot collide with an egg kicked off on the present cycle. As a result, using the conveyor belt 31 and by providing the guide 155, an egg such as egg 151 or 159 need not clear the last scale 35b before an additional ejection of eggs takes place.

Thus there has been shown an improved egg grading system capable of high speed operation while accurately determining the weights of the eggs being handled.

Although the above description is directed to a preferred embodiment of the invention, it is noted that other variations and modifications will be apparent to those skilled in the art and, therefore, may be made without departing from the spirit and scope of the present disclosure.

What is claimed is:

1. An egg grader having a plurality of weighing stations each capable of simultaneously weighing a plurality of eggs on a plurality of individual scales comprising means for lifting and transferring eggs from the scales at one station to that of the next station in the form of rotating lifter bars supported on the periphery of opposed rotating rings, a plurality of lifting fingers mounted on each of said lifter bars, an egg ejecting means for each of said scales which cooperates with means associated with the rotating rings to push an egg which has exceeded a preset weight off said scale, each of said lifting and transfer means including a pair of diametrically opposed lifter bars, the diametrically opposed lifting bars associated with adjacent stations being 90° out of phase with each other, and a conveyor belt disposed below the centerline of said lifter bars and having its movement perpendicular to the direction of movement of the eggs from station to station through said apparatus to receive eggs pushed off said scales and convey said eggs to a collection point, the eggs thereby having been graded.

2. Apparatus according to claim 1 wherein said conveyor belt is of a width capable of conveying two rows of eggs, side by side, and which further includes means for guiding eggs deposited on said belt at the end thereof away from said collection point to the outside of the belt whereby additional eggs may be deposited on said belt after the egg farthest from said collection point has travelled only half the width of a weighing station.

3. Apparatus according to claim 1 wherein each of said scales has a damping means associated therewith.

4. Apparatus according to claim 3 wherein each of said scales comprise:
   (a) a weighing beam having support fingers for supporting an egg attached to one end thereof;
   (b) pivotal support means on said apparatus for supporting said beam;
   (c) first and second stops for limiting the rotation of said beam in a clockwise and counterclockwise direction;
   (d) means for biasing said beam against one of said stops;
   (e) means for adjusting said biasing means; and
   (f) dash pot means mounted on said beam at the end opposite said support fingers.

5. Apparatus according to claim 1 wherein said rings are driven by a common drive system and wherein said drive system includes:
   (a) a drive motor;
   (b) a first sprocket coupled to said rotating rings;
   (c) a crankshaft having one end coupled to said motor and having rigidly coupled to the other end thereof, offset from the portion thereof driven by said motor, a second sprocket;
   (d) a chain coupling said first and second sprockets; and
   (e) a pair of spring loaded idler sprockets between said first and second sprockets for maintaining tension on said chain as said first sprocket travels in an eccentric path, the path of said first sprocket being adjusted with respect to the travel of said lifter bars on said rotating rings, so as to have a lower speed at the points where said bars lift eggs from said scales and deposit eggs on said scales than during the remaining travel of said bars.

6. Apparatus according to claim 5 wherein each of said rings contain a sprocket thereon, and further including a third sprocket coupled to said first sprocket and a chain engaging said ring sprockets and said third sprocket.

7. Apparatus according to claim 6 and further including rollers disposed between the rings at each station for maintaining said chain in contact with said sprockets over a predetermined arc thereof.

8. An egg grader having a plurality of stations at least one of which is capable of simultaneously weighing a plurality of eggs on a plurality of individual scales comprising means for lifting and transferring eggs from the scales at said station to support means at the next station, said lifting means being in the form of rotating lifter bars supported on the periphery of opposed rotating rings and containing lifting fingers thereon, each scale and support means being equipped with an egg ejecting means which cooperates with means associated with the rotating rings to push off an egg which has exceeded a preset weight, a conveyor belt disposed adjacent each station for movement perpendicular to the direction of movement of the eggs from station to station through said apparatus to receive eggs pushed off the scales and support means for conveying said eggs to a collection point, the eggs thereby having been graded, said conveyor belt being of a width capable of conveying two rows of eggs, side by side, and means for guiding the eggs deposited on said belt at the end thereof furthest from said collection point to the outside of the belt whereby additional eggs may be deposited on said belt after the egg farthest from said collection point has travelled approximately half the width of a weighing station.

9. A weighing machine having a plurality of stations at least one of which is a weighing station for simultaneously weighing a plurality of articles which comprises a plurality of article holding platforms disposed at each of said stations, a pair of rotating carrier bars mounted diametrically opposite each other at each of said stations, said carrier bars being adapted to deposit articles on said platform when passing downward and to lift articles from said platforms when passing upwards, a plurality of individual scales disposed at least at the first of said stations to facilitate weighing of the articles positioned on said platforms at said station, said scales being mounted within the orbit of said pair of carrier bars, means for restraining said carrier bars from rotation about their axis of rotation, a second pair of orbiting carrier bars disposed at each of the remaining stations timed to rotate in quadrature with the set of carrier bars disposed at the preceding station, said second pair of carrier bars having an orbit approximately tangent to the orbit of said preceding set of carrier bars with said platforms being located approximately at the line of tangency, and means for positioning incoming articles approximately 180° from said platforms in a position ready for pickup.

10. Apparatus according to claim 9 which further includes a variable speed drive means adapted to drive said carrier bars in unison so as to rotate said bars at a relatively slow speed as they pass said platforms, and at a higher speed once said bars have passed said platforms until such time as the next bars approach said platforms.

11. The apparatus according to claim 9 which further includes means for ejecting articles exceeding a predetermined weight at each of said stations.

12. The apparatus according to claim 11 which further includes rotating rings for supporting said carrier bars and conveyor means adapted to receive said ejected articles and convey them parallel to the axis of said rotating carrier bars and through the center of one of said rotating rings.

13. An egg grader comprising a plurality of weighing stations each capable of simultaneously weighing a plurality of eggs on a plurality of individual scales, means for lifting and transferring eggs from the scales at one station to that of the next station in the form of a pair of diametrically opposed rotating filter bars supported on the periphery of opposed rotating rings, said lifter bars containing lifting fingers thereon, each scale being equipped with an egg ejecting means which cooperates with means associated with the rotating rings to push an egg which has exceeded a preset weight off a scale, a conveyor belt disposed adjacent each station having its movement perpendicular to the direction of movement of the eggs from station to station through said apparatus to receive eggs pushed off the scales and conveyor said eggs to a collection point, the eggs thereby having been graded, and a drive system including a drive motor, a first sprocket coupled to said rotating rings, a crankshaft having one end coupled to said motor and having rigidly coupled to the other end thereof, offset from the portion thereof driven by said motor, a second sprocket, a chain coupling said first and second sprockets, and a pair of spring loaded idler sprockets between said first and second sprockets for maintaining tension on said chain as said first sprocket travels in an eccentric path, the path of said first sprocket being adjusted with respect to the travel of said lifter bars on said rotating rings, so as to have a lower speed at the point where said bars lift eggs from said scales and deposit eggs on said scales than during the remaining travel of said bars.

14. In an egg grader having at least one weighing station capable of simultaneously weighing a plurality of eggs; means for lifting and transferring eggs from said weighing station to a next station in the form of rotating lifter bars containing lifting fingers thereon, each station being provided with an egg ejecting means to remove an egg which has exceeded a preset weight from said station, and a conveyor means to receive ejected eggs and convey said eggs to a collection point the improvement comprising:

(a) each lifting and transfer means comprising a pair of diametrically opposed lifter bars, the diametrically opposed lifting bars associated with adjacent stations being approximately 90° out of phase with each other;

(b) said conveyor means comprising a conveyor belt of a width capable of conveying two rows of eggs, side by side, and means for guiding eggs deposited on said belt at the end thereof farthest from said collection point to the outside of the belt whereby additional eggs may be deposited on said belt after the egg farthest from said collection point has travelled only half the width of a weighing station; and (c) variable speed drive means for rotating said lifter bars at a minimum speed at the points where eggs are picked up and set down and at an increased speed therebetween.

15. The improvement according to claim 14 wherein said drive means comprise:

(a) a drive motor;

(b) a first sprocket coupled to said rotating rings;

(c) a crankshaft having one end coupled to said motor and having rigidly coupled to the other end thereof, offset from the portion thereof driven by said motor, a second sprocket;

(d) a chain coupling said first and second sprockets; and (e) a pair of spring loaded idler sprockets between said first and second sprockets for maintaining tension on said chain as said first sprocket travels in an eccentric path, the path of said first sprocket being adjusted with respect to the travel of said filter bars on said rotating rings, so as to have a minimum speed at the point where said bars lift eggs from said scales and deposit eggs on said scales.

16. An egg grader having a plurality of weighing stations, each capable of simultaneously weighing a plurality of eggs on a plurality of individual scales comprising means for lifting and transferring eggs from the scales at one station to that of the next station in the form of rotating lifter bars supported on the periphery of opposed rotating rings, each of said lifter bars containing lifting fingers thereon, an egg ejecting means provided for each of said scales which is adapted to push an egg which has exceeded a preset weight off said scale, and a conveyor belt disposed adjacent each station below the centerline of said lifter bars and having its movement perpendicular to the direction of movement of the eggs from station to station through said apparatus, said conveyor belt being adapted to receive eggs pushed off the scales and convey said eggs to a collection point, the eggs thereby having been graded, each of said scales comprising:

(a) a weighing beam having support fingers for supporting an egg attached to one end thereof;

(b) pivotal support means on said apparatus for supporting said beam;

(c) first and second stops for limiting the rotation of said beam clockwise and counterclockwise;

(d) spring means disposed intermediate said pivotal support means and said one end of said beam for biasing said beam in a counterclockwise direction towards said first stop;

(e) means for adjusting the tension of said spring biasing means;

(f) dash pot apparatus for damping movement of said beam disposed on the end of said beam opposite said support fingers; and (g) a counterweight disposed on said end of said beam opposite said support fingers.

17. An improved scale for weighing and grading eggs comprising:

(a) a weighing beam having support fingers for supporting an egg attached to one end thereof;

(b) pivotal support means for supporting said beam;

(c) first and second stops for limiting the rotation of said beam clockwise and counterclockwise;

(d) spring means disposed intermediate said pivotal support means and said one end of said beam for biasing said beam in a counterclockwise direction towards said first stop;

(e) means for adjusting the tension of said spring biasing means;

(f) dash pot apparatus disposed on the end of said beam opposite said support fingers including a dash pot containing a damping fluid, and a disc depending from said opposite end of said beam disposed in said damping fluid; and (g) a counterweight disposed on said end of said beam opposite said support fingers.

* * * * *

UNITED STATES PATENT AND TRADEMARK OFFICE
CERTIFICATE OF CORRECTION

PATENT NO. : 4,195,736
DATED : April 1, 1980
INVENTOR(S) : Thomas V. Loeffler

It is certified that error appears in the above—identified patent and that said Letters Patent is hereby corrected as shown below:

Column 8, line 66  -  change "filter" to --lifter--

Column 9, line 7  -  change "conveyor" to --convey--

Column 10, line 4  -  change "filter" to --lifter--

Signed and Sealed this

Eighth Day of July 1980

[SEAL]

Attest:

SIDNEY A. DIAMOND

Attesting Officer

Commissioner of Patents and Trademarks